（12） United States Patent
Scanlon, Jr. et al.

(10) Patent No.: US 9,209,487 B2
(45) Date of Patent: Dec. 8, 2015

(54) SOLID-STATE ELECTROLYTES FOR RECHARGEABLE LITHIUM BATTERIES

(71) Applicant: The United States of America, as Represented by the Secretary of the Air Force, Washington, DC (US)

(72) Inventors: Lawrence G Scanlon, Jr., Fairborn, OH (US); Joseph P Fellner, Kettering, OH (US); William A. Feld, Beavercreek, OH (US); Leah R. Lucente, Beavercreek, OH (US); Jacob W. Lawson, Springfield, OH (US); Andrew M. Beauchamp, Lancaster, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/333,836

(22) Filed: Jul. 17, 2014

(65) Prior Publication Data

US 2014/0329135 A1   Nov. 6, 2014

Related U.S. Application Data

(63) Continuation-in-part of application No. 13/156,775, filed on Jun. 9, 2011, now Pat. No. 8,974,974.

(60) Provisional application No. 61/847,368, filed on Jul. 17, 2013.

(51) Int. Cl.
| | |
|---|---|
| *H01M 10/0562* | (2010.01) |
| *H01M 10/0564* | (2010.01) |
| *H01M 10/0525* | (2010.01) |
| *H01M 4/60* | (2006.01) |
| *H01M 4/62* | (2006.01) |
| *H01M 4/134* | (2010.01) |
| *H01M 4/40* | (2006.01) |

(52) U.S. Cl.
CPC ............ *H01M 10/0564* (2013.01); *H01M 4/60* (2013.01); *H01M 4/62* (2013.01); *H01M 10/0525* (2013.01); *H01M 4/134* (2013.01); *H01M 4/405* (2013.01); *H01M 2300/0065* (2013.01); *H01M 2300/0091* (2013.01); *Y02E 60/122* (2013.01)

(58) Field of Classification Search
None
See application file for complete search history.

(56) References Cited

U.S. PATENT DOCUMENTS

| | | |
|---|---|---|
| 5,932,133 A | 8/1999 | Scanlon, Jr. |
| 6,010,805 A | 1/2000 | Scanlon, Jr. et al. |
| 6,541,161 B1 | 4/2003 | Scanlon, Jr. |
| 2013/0309561 A1 | 11/2013 | Chen et al. |

(Continued)

OTHER PUBLICATIONS

L. G. Scanlon et al., "Low energy of activation lithium-ion conducting channel," ECS Trans., vol. 25 (2010) 163-167.

(Continued)

*Primary Examiner* — Patrick Ryan
*Assistant Examiner* — Lucas J O'Donnell
(74) *Attorney, Agent, or Firm* — AFMCLO/JAZ; Chastity Whitaker

(57) ABSTRACT

A lithium ion battery cell. The lithium ion battery cell includes a lithium-based anode, a cathode, and a solid-state electrolyte positioned between the lithium-based anode and the cathode. The cathode comprises alkylammonium cation lithium phthalocyanine anion complex. The solid-state electrolyte comprises an alkoxyalkylammonium cation lithium phthalocyanine anion complex.

13 Claims, 9 Drawing Sheets

(56) References Cited

U.S. PATENT DOCUMENTS

2014/0072871 A1 3/2014 Chen et al.
2014/0072879 A1 3/2014 Chen et al.

OTHER PUBLICATIONS

S. Okada et al., "Intercalation mechanism in lithium/iron-phthalocyanine cells," J. Electrochem. Soc., vol. 136 (1989) 340-344.
J-I. Yamaki et al., "Phthalocyanine cathode materials for secondary lithium cells," J. Electrochem. Soc., vol. 129 (1982) 5-9.
L. G. Scanlon et al., "Hydrogen storage based on physisorption," J. Phys. Chem. B., vol. 113 (2009) 4708-4717.
K. Lamonte et al., "Molecular dynamics simulations of H2 adsorption in tetramethyl ammonium lithium phthalocyanine crystalline structures," J. Phys. Chem. B., vol. 112 (2008) 15775-15782.
P. B. Balbuena, "Modeling lithium-ion conducting channel," Aerospace Power Scholarly Research Program, Delivery Order 0011, ARFL-PR-WP-TR-2005-2190 (2005) 24 pages total.
W. A. Feld, "Single lithium ion conducting polymer electrolyte," Aerospace Power Scholarly Research Program Delivery Order 0011, AFRL-PR-WP-TR-2005-2197 (2005) 29 pages total.
W. A. Feld, "Single lithium ion conducting polymer electrolyte," Aerospace Power Scholarly Research Program Delivery Order 0007, AFRL-PR-WP-TR-2005-2185 (2005) 21 pages total.
Z. Florjanczyk, "Novel, solvent-free, single ion-conductive polymer electrolytes," FA8655-05-1, 3014 (2008) 74 pages total.
B. Scrosati, "Novel, solvent-free, single ion conducting polymer electrolytes," Final Report in F61775-01-WE021 (2004) 15 pages total.
A. Turner, "Single ionic conducting polymer electrolyte," Aerospace Power Scholarly Research Program Delivery Order 0011, AFRL-PR-WP-TR-2005-2189 (2005) 19 pages total.
A. Turner, "Single ionic conducting solid-state electrolyte," Power and Thermal Technologies for Air and Space Delivery Order 0001, AFRL-PR-WP-TR-2006-2164 (2005) 22 pages total.
United States Patent and Trademark Office, Notice of Allowance in U.S. Appl. No. 13/156,775, mailed Oct. 7, 2013, 25 pages total.
United States Patent and Trademark Office, Non-Final Office Action in U.S. Appl. No. 13/156,775, mailed Jun. 16, 2014, 14 pages total.
2LT A. Beauchamp, "The Synthesis of Room-Temperature Ionic Liquids and Their Metathesis Reactions with Dilithium Phthalocyanine," Thesis Defense Presentation on Mar. 14, 2012, 62 pages total.
2LT A. Beauchamp, A thesis submitted in partial fulfillment of the requirements for the degree of Masters of Science at Wright State University, Jul. 17, 2012, 100 pages total.
M. Tatsumisago et al., "Recent development of sulfide solid electrolytes and interfacial modification for all-solidstate rechargeable lithium batteries," J. Asian Cer. Soc., vol. 1 (2013) 17-25.
R. Van Noorden, "Sulphur back in vogue for batteries," Nature, vol. 498 (2013) 416-417.
United States Patent and Trademark Office, Final Office Action in U.S. Appl. No. 13/156,775, mailed Oct. 16, 2014, 11 pages total.

SOLID-STATE ELECTROLYTES FOR RECHARGEABLE LITHIUM BATTERIES

Pursuant to 37 C.F.R. §1.78(a)(4), this application claims the benefit of and priority to prior filed Provisional Application No. 61/847,368, filed 17 Jul. 2013. This application is also a continuation-in-part of U.S. application Ser. No. 13/156,775, filed 9 Jun. 2011. The disclosure of each of these applications is hereby incorporated herein by reference, in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to rechargeable batteries and, more particularly, to rechargeable lithium batteries.

BACKGROUND OF THE INVENTION

Lithium Ion Batteries ("LIB") are a class of rechargeable batteries in which lithium ions move from a negatively-charge electrode to a positively-charged electrode during discharge and vice-versa during recharge. The rechargeability of LIBs makes them particularly useful in consumer electronics and military applications (such as electric and aerospace vehicles). Yet, conventional LIBs have some inherent safety hazards, including, probably most significantly, pressurized, liquid-based, non-aqueous, flammable electrolytes. Exemplary electrolytes of this class include lithium salts (such as, $LiPF_6$, $LiBF_4$, or $LiClO_4$) in an organic solvent (such as, ethylene carbonate, dimethyl carbonate, or diethyl carbonate), having ion conductivities, at room temperature (about 20° C.) of about 10 mS/cm. The conductivities increase (30% to 40%) at temperatures of about 40° C. and decrease at 0 or below.

One solution to the flammability hazard has been the use of solid-state electrolytes ("SSE"). In some instances, conventional SSEs have specific ionic conductivities on the order of $10^{-3}$ S/cm (at room temperature), which can make the use of SSEs comparable to their liquid-based counterparts. In fact, when the lithium transfer number is 1, concentration gradients at high discharge rates can be avoided with SSEs. Some conventional SSEs presently in use in LIBs include: (1) highly lithium ion conducting glass-ceramic solid-SSEs based on $Li_2S-P_2S_5$ and having an energy of activation ("$E_a$") of 12 kJ/mol; (2) thio-LISICON-lithium superionic conductor SSEs ($Li_{3.25}S—Ge_{0.25}—P_{0.75}S_4$) having of about $E_a$ of 20-45 kJ/mol but as a function of heat treatment temperature; and (3) Ohara glass ceramic, having an $E_a$ of about 35 kJ/mol. Use of the $Li_2S—P_2S_5$-based SSEs requires the use of an Argon-filled dry box. Despite the fast lithium conduction characteristic of these conventional SSEs, cell component integration associated with high-impedances at the glass-ceramic solid-state electrolyte/electrode interface can impede the use of these materials. Some have used intermediate layers, such as Lithium Phosphorus Oxynitride ("LIPON") or other polymer-based electrolytes, to facilitate a connection between the glass-ceramic electrolyte and electrode. However, LIPON has a low specific ionic conductivity ($10^{-6}$ S/cm) and a high $E_a$ of 53 kJ/mol at room temperature. Moreover, sputter deposition is required for integrating LIPON into an electrochemical cell, which makes cost and fabrication of large area, pin-hole free electrolytes significant issues.

Thus, there remains a need for materials suitable for use in LIB cells having the operability of liquid-based electrolytes with the stability and safety associated with SSEs.

SUMMARY OF THE INVENTION

The present invention overcomes the foregoing problems and other shortcomings, drawbacks, and challenges of conventional LIBs utilizing SSEs. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a lithium ion battery cell includes a lithium-based anode, a cathode, and a solid-state electrolyte positioned between the lithium-based anode and the cathode. The cathode comprises an alkylammonium cation lithium phthalocyanine anion complex. The solid-state electrolyte comprises an alkoxyalkylammonium cation lithium phthalocyanine anion complex.

In one aspect of the invention, the alkoxyalkylammonium cation of the solid-state electrolyte may be 2-(2-methoxyethyoxy)-N,N-bis[2-(2-methoxyethyoxy)ethyl]-N-methyl-ethanaminium or N,N-dibutyl-N-(2-ethyoxyehtyl)-1-butanaminium.

In another embodiment of the present invention, a lithium ion battery includes a plurality of the lithium ion battery cells arranged in series and with the anode of one lithium ion battery cell being adjacent to the cathode of another lithium ion battery cell. The lithium ion battery also includes negative and positive terminals. These terminals are adjacent to the anode and the cathode, respectively, of the outer-most ones of the lithium ion battery cells of the plurality.

Still another embodiment of the present invention is directed to a cathode material for use in a lithium ion battery. The material is complex of alkylammonium cations and lithium phthalocyanine anions.

The alkylammonium cation of the cathode material may be tetrabutylammonium, tridodecylbutylammonium, or 1,3-bis(1-adamantyl)imidazolium.

Yet other embodiments of the present invention are directed to a solid-state electrolyte material for use in a lithium ion battery. The material is a complex of alkoxyalkylammonium cations and lithium phthalocyanine anions.

The alkoxyalkylammonium cation of the solid-state electrolyte material may be 2-(2-methoxyethyoxy)-N,N-bis[2-(2-methoxyethyoxy)ethyl]-N-methylethanaminium or N,N-dibutyl-N-(2-ethyoxyehtyl)-1-butanaminium.

In accordance with another embodiment of the present invention, a method of manufacturing a lithium ion battery cell comprises applying a solid-state electrolyte, comprising an alkoxyalkylammonium cation lithium phthalocyanine anion complex, to a lithium-based cathode and applying a lithium-based anode to the solid-state electrolyte, opposite the lithium-based cathode. Prior to the application of each subsequent layer, the base layer is subjected to a thermal process.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
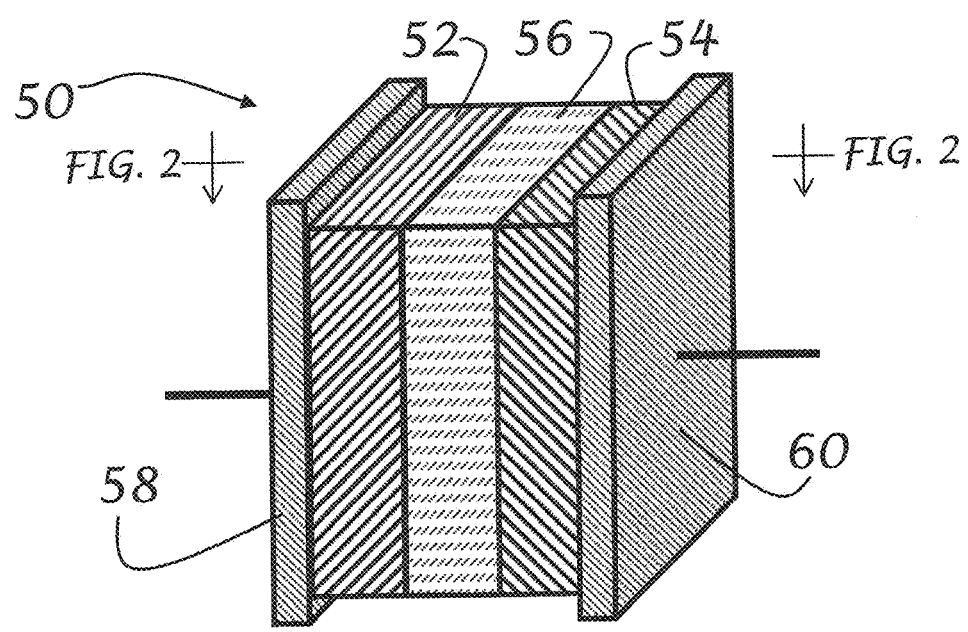
FIG. 1 is a perspective view of a lithium ion battery having a cathode, an anode, and a solid-state electrolyte in accordance with an embodiment of the present invention.

Turning now to the figures, and in particular to FIG. 1, a lithium ion battery 50 ("LIB") according to one embodiment of the present invention is shown. The LIB 50 comprises a positive electrode 52 (referenced herein as a "cathode"), a negative electrode 54 (referenced herein as an "anode"), a solid-state electrolyte 56 ("SSE") positioned between the cathode 52 and the anode 54, and first and second current terminals 58, 60 on the cathode 52 and the anode 54, respectively, and opposing the SSE 56. Each of the first and second current terminals 58, 60 are configured to be coupled to positive and negative contacts (illustrated as ⊕ and ⊖, respectively in FIG. 2) of an associated load 62 (FIG. 2) and in a manner that would be understood by those skilled in the art.

Figure 3:
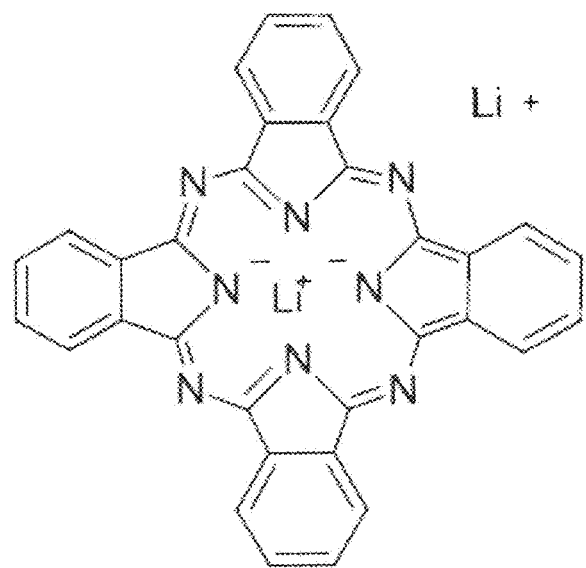
FIG. 3 is a skeleton formula of dilithium phthalocyanine
Figure 4:
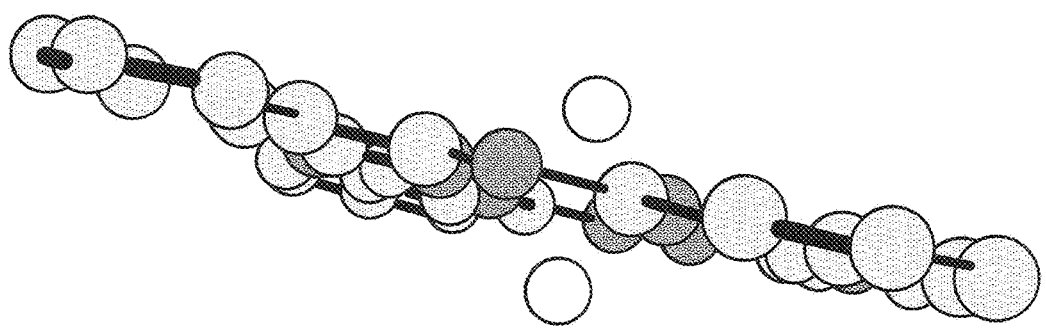
FIG. 4 is a space field structure of dilithium phthalocyanine.
Figure 5:
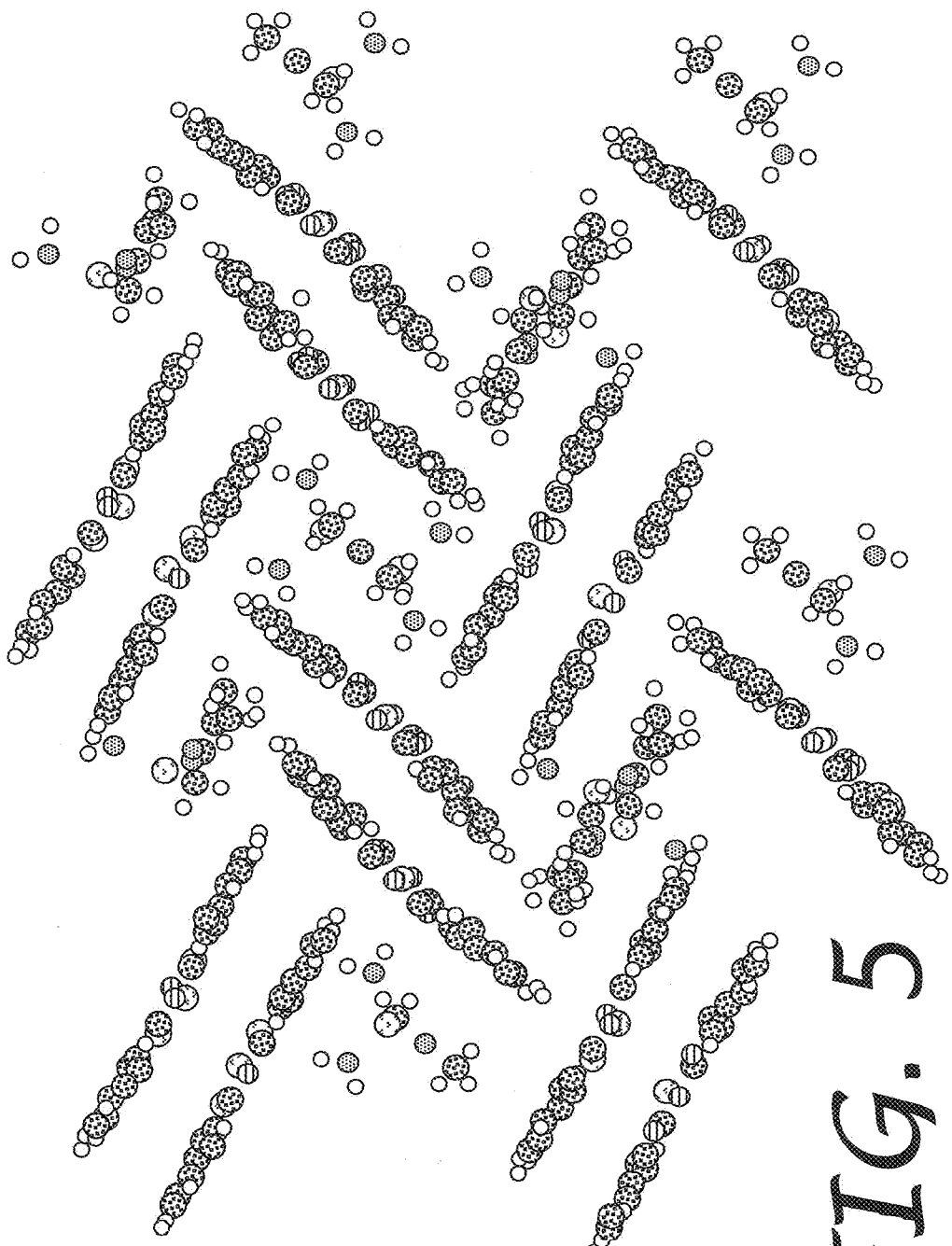
FIG. 5 illustrates a unit cell crystal structure of dilithium phthalocyanine

More particularly, the anode 54 of the LIB 50 of FIG. 1 may be comprised of a metal, such as a lithium foil, or a lithium composite anode ("LCA") comprising lithium metal with di-lithium phthalocyanine ("Li$_2$Pc"). Skeletal formula and space filled Li$_2$Pc structure are shown in FIGS. 3 and 4, respectively. While not wishing to be bound by theory, it is believed that a Li$_2$Pc crystal structure (FIG. 5) presents a three-dimensional negative electrostatic potential field that, in effect, acts as the solvation sphere of the solid-state molecular system.

An exemplary manufacturing process for the anode 54 comprising the LCA may include placing Li$_2$Pc (with or without a binder, such as Kynar Flex® 2801, Arkema Inc., Philadelphia, Pa.) onto the SSE and drying under vacuum prior to placing lithium metal onto the Li$_2$Pc. According to other embodiments of the present invention, the LCA may be manufactured by ink-jet printing or casting techniques, such as spin casting or solution casting.

Figure 6:
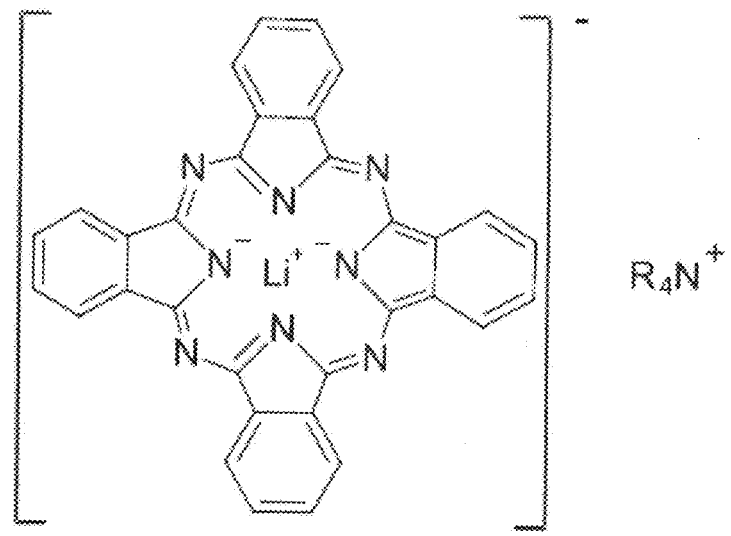
FIG. 6 is a skeleton formula of tetrabutylammonium lithium phthalocyanine

Referring again to FIGS. 1 and 2, the cathode 52 of the LIB 50 may comprise a first substituted lithium phthalocyanine ("R$_1$LiPc"), with or without a lithium salt with an electrically conducting additive, and where R$_1$ may be a quaternary ammonium cation (or, more particularly, an alkylammonium) or a quaternary cation wherein the nitrogen of the quaternary ammonium cation may be replaced with another element, such as phosphorus. According to one embodiment of the present invention, R$_1$LiPc may be tetrabutylammonium lithium phthalocyanine (hereafter, "TBA-LiPc"), wherein a skeletal formula of such is shown in FIG. 6. Anion separation, as determined by crystal structure (not shown), is about 8 Å, making TBA-LiPc operable as an electronic insulator.

Alternatively, and according to some embodiments, a lithium salt may be necessary to promote fast lithium ion conduction through TBA-LiPc. Suitable lithium salts may include, but are not limited to, lithium bis(trifluoromethanesulfonyl)imide (hereafter, "LiTFSI"), lithium tetrafluoroborate (hereafter, "LiBF$_4$"), lithium iodide (hereafter, "LiI"), lithium bromide (hereafter, "LiBr"), and lithium chloride (hereafter, "LiCl"). Effective mole ratios of TBA-LiPc to lithium salt may range from 1:1 to 99:1.

TBA-LiPc, and other like R$_1$LiPc complexes (for example, tridodecylbutylammonium lithium phthalocyanine ("TDBA-LiPc")) may be synthesized, according to one embodiment of the present invention, by an exchange/metathesis reaction between Li$_2$Pc and, for example, tetrabutylammonium bromide (as to TBA-LiPc) or tridodecylbutylammonium nitrate (as to TDBA-LiPc). Other R$_1$LiPc complexes having one lithium ion and one substitute alkylammonium cation are envisioned and should not be limited to those explicitly described herein.

Figure 7:
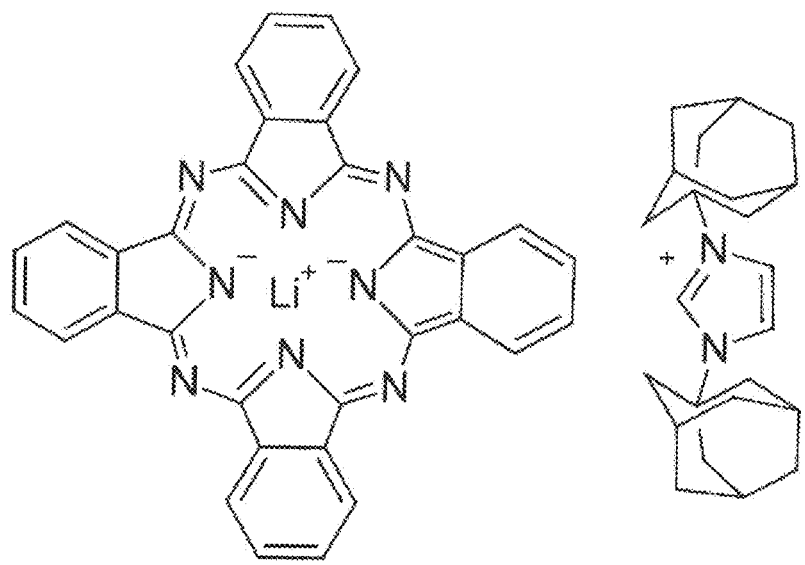
FIG. 7 is a skeleton formula of 1,3-bis(1-adamantyl)imidazolium lithium phthalocyanine.
Figure 8:
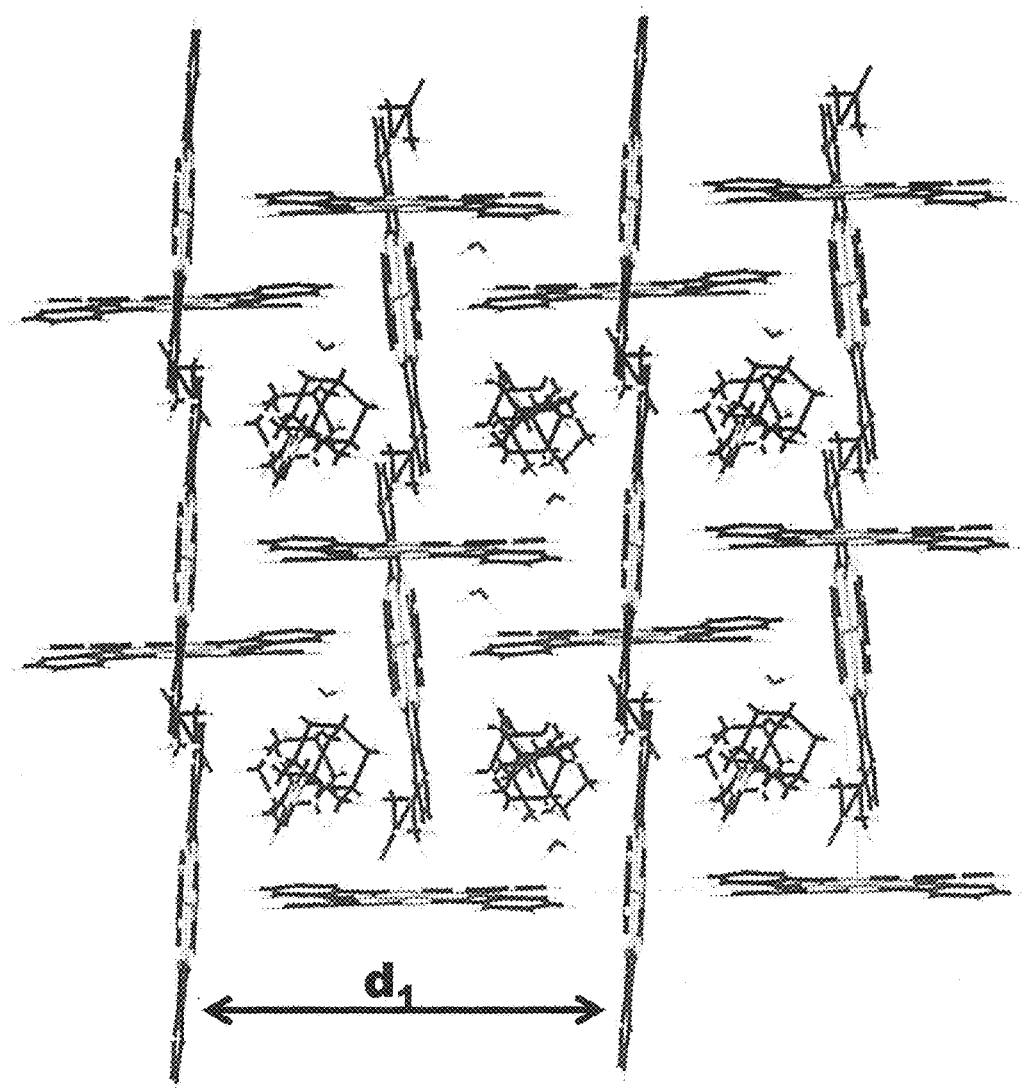
FIG. 8 illustrates a unit cell crystal structure of 1,3-bis(1-adamantyl)imidazolium lithium phthalocyanine.

Another R$_1$LiPc complex for use in constructing still other embodiments of cathodes 52 (FIG. 1) may include 1,3-bis(1-adamantyl)imidazolium lithium phthalocyanine (hereafter, "BAI-LiPc"), which may be synthesized by an exchange reaction with 1,3-disubstituted imidazolium cations and Li$_2$Pc. A skeletal formula and a crystal structure of such being shown in FIGS. 7 and 8, respectively. The crystal structure of BAI-LiPc (FIG. 8) indicates both water and acetone in the unit cell, both of which participate in hydrogen bonding with LiPc and the imidazolium cation. A distance, illustrated as "d$_1$" in FIG. 8, between adjacent pairs of rings was found to be 10.10 Å, which is much larger than the analogous distance found in the TBA-LiPc complex.

As was noted above, some embodiments utilizing the BAI-LiPc cathode may benefit from the addition of a lithium salt.

The lithium salt may be those described previously or other suitable salt, and the mole ratio of BAI-LiPc to lithium salt may range from 1:1 to 99:1.

Still other R₁LiPc complexes are described in detail in A. BEAUCHAMP, The *Synthesis of Room-Temperature Ionic-Liquids and Their Metathesis Reactions with Dilithium Phthalocyanine*, A thesis submitted in partial fulfillment of the requirements for the degree of Masters of Science at Wright State University (2012) 100 pages total. The disclosure of this master's thesis is incorporated here by reference, in its entirety.

Referring again to FIGS. 1 and 2, the SSE 56 of the LIB 50, according to embodiments of the present invention, may include a second substituted LiPc complex (hereafter, R₂LiPc), wherein R₂ may be an alkoxyalkylammonium cation or, more generally, is selected so as to avoid electronic conduction (presumably due to pi-orbital overlap). One such suitable R₂LiPc is 2-(2-methoxyethyoxy)-N,N-bis[2-(2-methoxyethyoxy)ethyl]-N-methylethanaminium lithium phthalocyanine (hereafter, "TAMe-LiPc"). SSEs 56 comprising TAMe-LiPc complexed with Li₂Pc (mole ratio ranging from 99:1 to 1:1 or 1:1 to 1:99), with or without the binder (such as Kynar Flex®) may be ink jetted or cast (spin casting or solution casting, for example), or otherwise applied to the cathode 52 or the anode 54, with the anode 54 or the cathode 52, respectively, being then applied to an opposing side of the SSE 56. If desired, or necessary, the SSE 56 may be thermally processed to remove residual solvent, ensure optimum molecular rearrangement, lower its resistance, and achieve an equilibrium phase. Thermally processing may vary but may generally include increasing temperatures over a period of days, followed by a controlled lowering of the temperature back to ambient conditions. Moreover, thermal processing may be applied to the cathode 52, the SSE 56, the anode 54, or the composite structure of these components.

Figure 9:
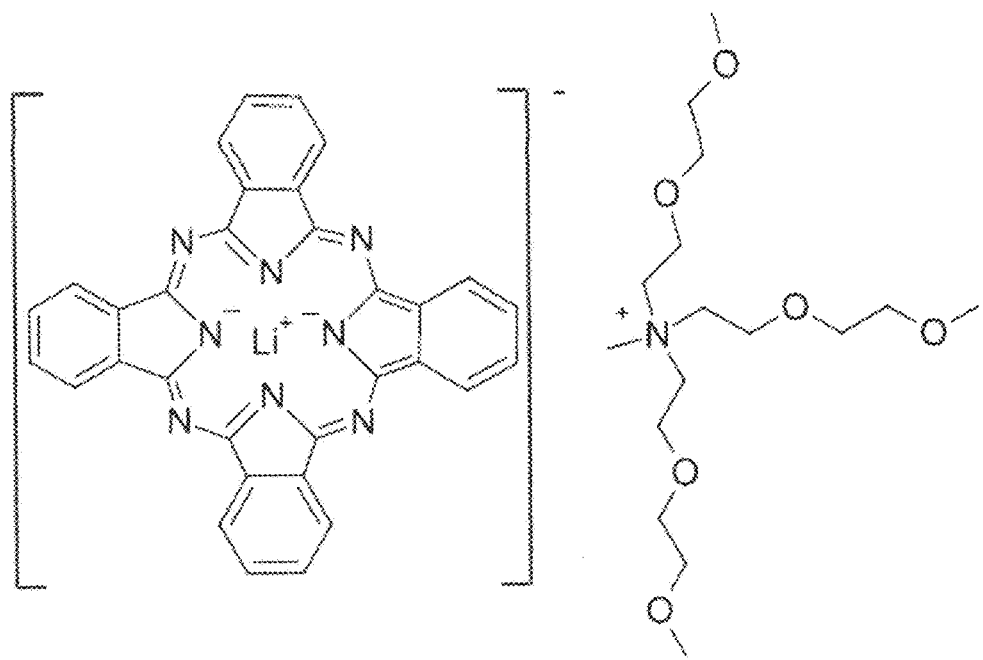
FIG. 9 is a skeleton formula of N,N-dibutyl-N-(2-ethyoxyehtyl)-1-butanaminium lithium phthalocyanine.
Figure 10:
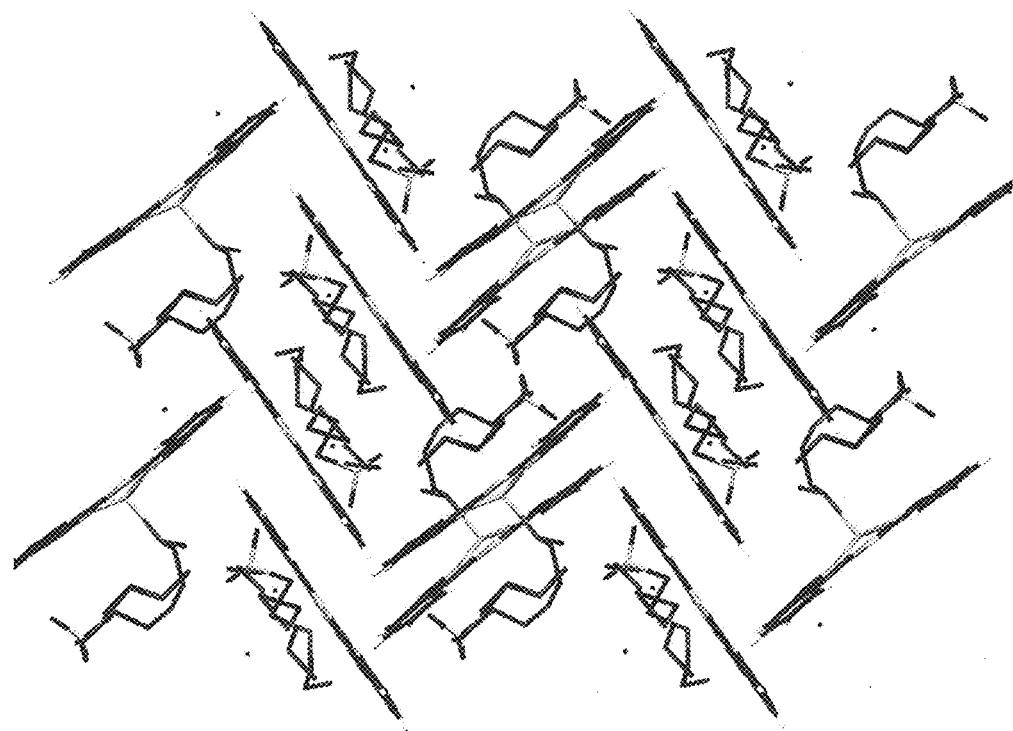
FIG. 10 illustrates a unit cell crystal structure of N,N-dibutyl-N-(2-ethyoxyehtyl)-1-butanaminium lithium phthalocyanine.
Figure 11:
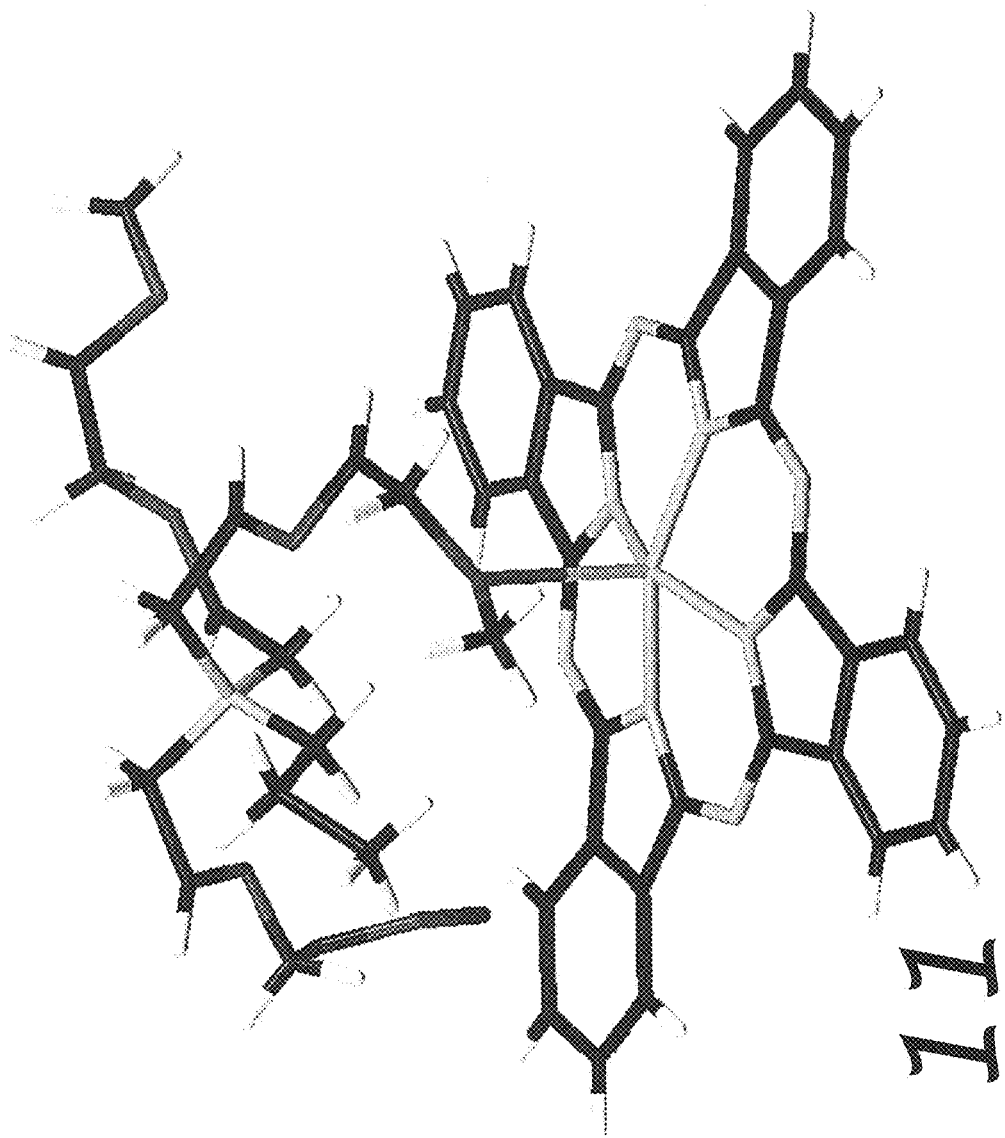
FIG. 11 is a stick diagram view of one N,N-dibutyl-N-(2-ethyoxyehtyl)-1-butanaminium lithium phthalocyanine complex of FIG. 10, enlarged to illustrate the coordination of an oxygen of the N,N-dibutyl-N-(2-ethyoxyehtyl)-1-butanaminium with the lithium phthalocyanine.

A skeletal formula and a crystal structure of TAMe-LiPc are shown in FIGS. 9 and 10, respectively. The crystal structure of FIG. 10 demonstrates that the R₂ group, when coordinated with the lithium phthalocyanine (refer to enlarged, stick diagram of FIG. 11), causes parallel lithium phthalocyanine anions to be offset in at least two dimensions—here, the offsets are in separation and in shift. Such offset between parallel lithium phthalocyanine anions is believed to disrupt cathodic behavior of the SSE 56, R₂LiPc complexes, while still providing a suitable solvation sphere for lithium ion conduction via delocalized negative potential field of the phthalocyanine anion. Again, while not wishing to be bound by theory, the disruptions via the separation and shift offsets are due to a key electrostatic interaction between an oxygen atom of the alkoxy chain of the cation and the lithium ion of the phthalocyanine anion.

In operation, as deduced from the crystal structure shown in FIG. 10, the three alkoxy chains of the quaternary ammonium cation, each having two oxygen atoms, may contribute to segmental motion, which in turn may enable ionic conduction.

Figure 2:
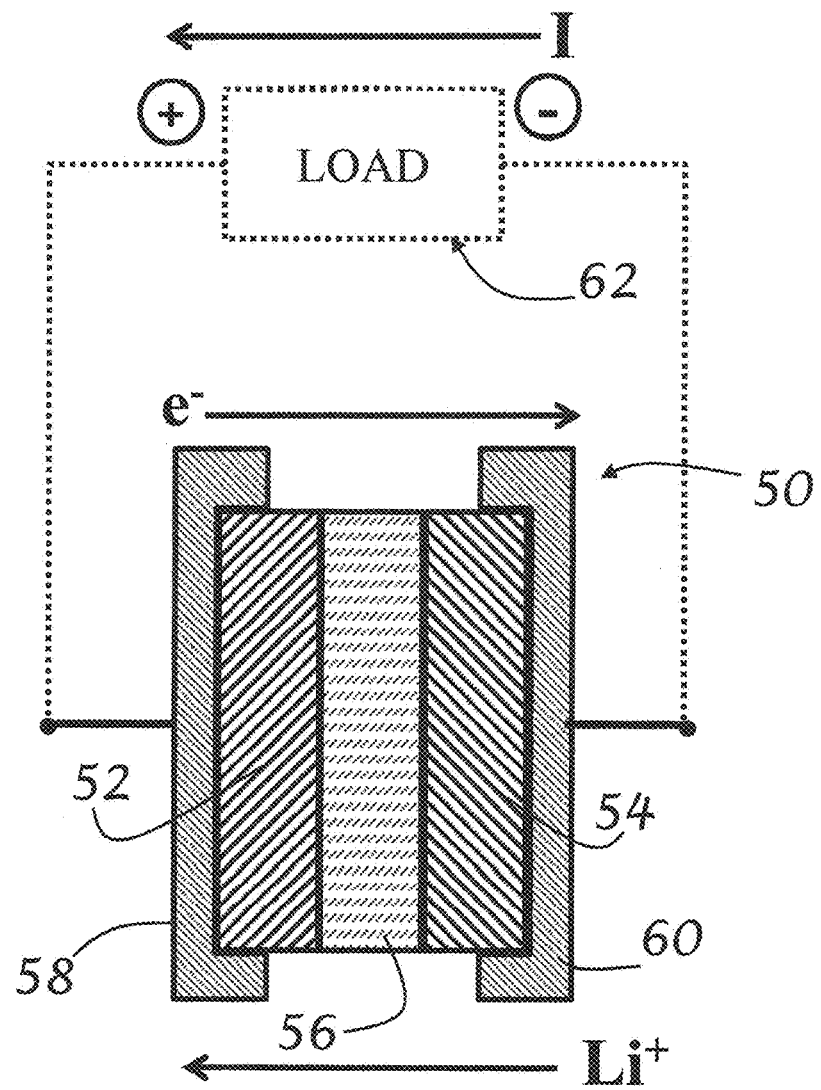
FIG. 2 is a cross-sectional view of the lithium ion battery of FIG. 1, taken along the line FIG. 2-FIG. 2 in FIG. 1, and with a working load shown in phantom.
Figure 12:
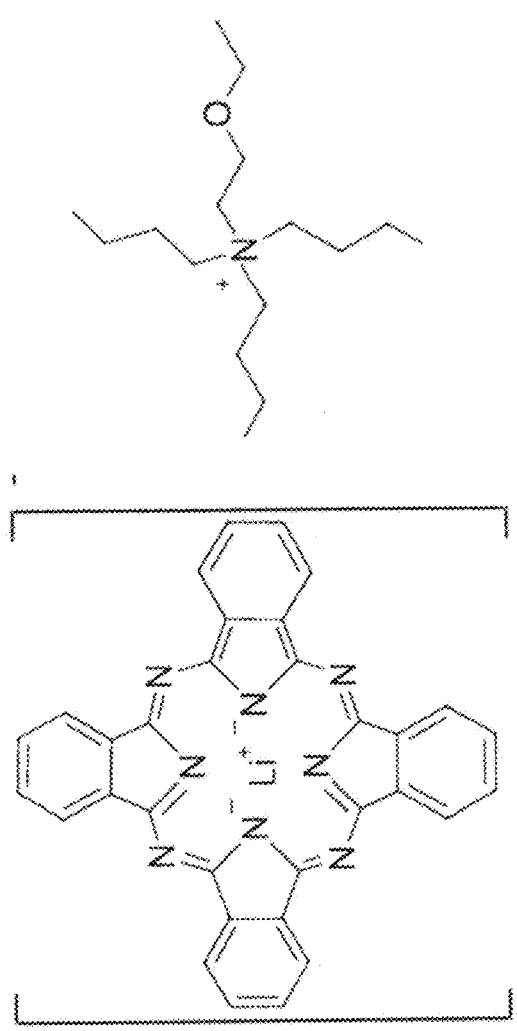
FIG. 12 is a skeleton formula of N,N-dibutyl-N-(2-ethyoxyethyl)-1-butanaminium lithium phthalocyanine.

Still referring to FIGS. 1 and 2, and according to still yet another embodiment of the present invention, the substituted LiPc of the SSE 56 of the LIB 50 may be N,N-dibutyl-N-(2-ethyoxyethyl)-1-butanaminium lithium phthalocyanine (hereafter, "BLLEEPc"), a skeletal formula of such being shown in FIG. 12. According to this embodiment, the quaternary ammonium cation includes three n-butyl groups and an ethoxyethyl functional group. SSEs 56 having a mole ratio of BLLEEPc to Li₂Pc (ranging from 99:1 to 1:1 or 1:1 to 1:99) may be manufactured as described above.

SSEs 56, in accordance with still other embodiments, may be a composite material of the substituted LiPc molecules (such as, TAMe-LiPc or BLLEEPc) with a lithium salt charge carrier, including those that are described above. Mole ratios of substituted LiPc molecules, such as TAMe-LiPc or BLLEEPc, to lithium salts may range from 1:1 to 99:1.

Referring now again to FIG. 2, a use of the LIB 50 according to embodiments here is shown. Generally, during discharge or normal use of the LIB 50, lithium ions move from the anode 54 to the cathode 52 via the SSE 56, which is shown by the arrow in FIG. 2 labeled "Li⁺". The movement of electrons, illustrated as an arrow labeled "e⁻," is in a direction opposing the movement of Li⁺:

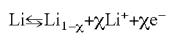

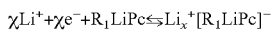

The resultant reaction is:

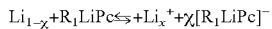

where current, illustrated as an arrow labeled "I," moves from the anode 54, through the load 62 to perform work, and back into the cathode 52.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

EXAMPLE 1

A 340 μmm thick film of a 1:1 mole ratio of TBA-LiPc to LiTFSI had an ionic conduction of $1.3 \times 10^{-4}$ S/cm at 298 K with an energy of activation of 31.8 kJ/mol. An 87.5 μm thick film had an ionic conduction of $1.45 \times 10^{-5}$ S/cm at 298 K.

An 87 μm thick film of a 2:1 ratio of TBA-LiPc to LiTFSI had an ionic conduction of $1.2 \times 10^{-5}$ S/cm at 298 K had an energy of activation of about 14.5 kJ/mol.

A slurry-based cathode comprising a 70 μm thick film of a 1:1 ratio TBA-LiPc was discharged at a c/12 rate (that is, 12 hours to full discharge) had a specific capacity of about 172 mAh/g

EXAMPLE 2

Solid-State Electrolytes

An SSE comprising a 243 μm thin film of TAMe complexed with LiTSFI at a 2:1 ratio had an energy of activation of 0.78 eV (75 kJ/mol) over a broad range of temperatures (from subambient to 373 K).

An SSE comprising an 80 μm thin film of BLLEEPc complexed with Li₂Pc at a 1:6.1 ratio had an ionic conductivity ranging from $8.2 \times 10^{-5}$ S/cm at room temperature and an energy of action of about 7.76 kJ/mol.

EXAMPLE 3

Lithium Ion Battery

An LIB cell according to embodiments of the present invention was prepared having a lithium metal anode, a TBA-LiPc cathode, and a TAMe-LiPc based SSE. The LIB cell was discharged at a c/12 rate, using 100 μAmp of constant current (172 mAh/g) and cycled 7 to 8 times at 373 K for over a month without failure. By comparison, most conventional LIB cells fail at 333 K within a few hours.

EXAMPLE 4

Synthesis and Characterization

Purified 1,3-bis(1-adamantyl)imidazolium tetrafluoroborate (0.843 g, 1 eq) was dissolved in 10 mL of acetone and added to a solution of dilithium phthalocyanine (0.991 g, 1 eq) in 100 mL of acetone. The solution was evaporated to a volume of 20 mL to 30 mL under reduced pressure, sealed, and cooled at 5° C. for 72 h. The resulting solid was filtered and redissolved in 125 mL of hot acetone with stirring (some undissolved solid was filtered). The volume was reduced and crystallization was allowed to proceed at 5° C. to yield purple crystals (55.3%): m.p. 349-351° C.; $^1$H NMR (300 MHz, DMSO-$d_6$) δ 9.35-9.25 (m, 8H, Ar—H), 9.06 (s, 1H, Ar—H), 8.12-8.02 (m, 8H, Ar—H), 8.01 (d, 2H, Ar—H), 2.24-2.09 (m, 18H, Al—H), 1.82-1.62 (m, 12H, Aliph-H); $^{13}$C NMR (75 MHz, DMSO-$d_6$) δ 154.14, 140.05, 131.23, 127.51, 119.31, 59.35, 41.46, 34.81, 28.83; IR (KBr) cm$^{-1}$ 3053, 2912, 1604, 1583, 1485, 1092, 1055. Anal. Calc. for $C_{55}H_{49}LiN_{10}$ (856.99): C, 77.08; H, 5.76; N, 16.34. Found: C, 76.89; H, 5.90; N, 15.94.

To purified dilithium phthalocyanine (5.1492 g, 1 eq) in 200 mL of acetone was added an equimolar amount of tetrabutylammonium bromide (3.1868 g, 1.01 eq) dissolved in 80 mL of dichloromethane. The mixture was washed 4 times with 200 mL portions of deionized water in a reparatory funnel. The organic layer was filtered, evaporated to approximately 1/10 of the original volume, and cooled at −20° C. for 24 h. The purple crystalline product (64.3%) was dried in vacuo at 60° C. for 6 h to 8 h: m.p. 245.6-247.9° C.; $^1$H NMR (300 MHz, acetone-d6) δ 9.26-9.23 (m, 8H, Ar—H), 7.92-7.89 (m, 8H, Ar—H), 2.89-2.84 (m, 8H, —$CH_2$), 1.33-1.28 (m, 8H, —$CH_2$), 1.06-0.94 (m, 8H, —$CH_2$), 0.65 (t, 12H, —$CH_3$); $^{13}$C NMR (75 MHz, acetone-$d_6$) δ 155.52, 141.73, 128.11, 122.59, 59.09, 24.14, 20.15, 13.67; IR (NaCl) cm$^{-1}$ 3060, 1381, 1331, 1281, 1167, 1115, 1095, 1057, 781, 750. Anal. Calc. for $C_{48}H_{52}LiN_9$ (761.93): C, 75.67; H, 6.88; N, 16.54. Found: C, 75.83; H, 6.95; N, 16.70.

To a slurry of $Li_2Pc$ 1 (2.4071 g, 3.201 mmol) in 30 mL dichloromethane was added ionic liquid tris[2-(2-methoxyethoxy)ethyl]methylammonium iodide (1.4925 g, 3.207 mmol) dissolved in 30 mL dichloromethane. The volume of dichloromethane was doubled and the mixture was stirred for 45 min. The mixture was then filtered and the volume of the filtrate was reduced and cooled to 0° C. to crystallize. The product was isolated by filtration in 61% yield. Anal. Calcd. For $C_{48}H_{52}LiN_9O_6$: C, 67.20%; H, 6.11%; N, 14.69%. Found: C, 65.99%; H, 4.50%; N, 17.01%.

Dilithium phthalocyanine ($Li_2Pc$ 5.52 g, 0.0073 mol, 70% purity Sigma-Aldrich) was dissolved in 400 mL of acetone and filtered. Tributyl(ethoxyethyl)ammonium bromide (2.49 g, 0.0073 mol) was dissolved in 400 mL of DCM. The two solutions were mixed and stirred for 30 min. The solution was washed with water (3×800 mL) and the organic phase was filtered. The volume of the organic layer was reduced to 80 mL, and the solution was cooled overnight in the freezer. After crystallization occurred, the solution was filtered, and the product was briefly air dried and placed in a pre-weighed sample tube. The product (3.38 g, 0.0043 mol, 59%) was dried in vacuo overnight at 60° C.: mp 216-217° C.; $^1$H NMR (Acetone-$d_6$, δ) 0.61 (t, 9H, $CH_3$), 0.81 (t, 3H, $CH_3$), 0.86 (sx, 6H, $CH_2$), 0.99 (qn, 6H, $CH_2$), 2.43 (m, 2H, $CH_2$), 2.59 (t, 6H, $CH_2$), 2.97 (m, 4H, $CH_2$), 8.05 (m, 8H, ArH), 9.39 (m, 8H, ArH). Anal. Calcd. for $C_{48}H_{52}LiN_9O$; C, 74.11; H, 6.74; N, 16.20. Found: C, 74.24; H, 6.67; N, 16.28.

As described in detail herein, compositions for LIB components include SSEs that are configured to provide fast lithium ion conduction, are electrically insulating, are functional over a broad range of temperatures, are stable at elevated temperatures (up to approximately 200° C.), and do not include non-aqueous electrolyte compositions. The compositions permit low cost manufacturing, for example, by ink jetting processes.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A lithium ion battery cell comprising:
a lithium-based anode;
a cathode comprising an alkylammonium cation lithium phthalocyanine anion complex; and
a solid-state electrolyte comprising an alkoxyalkylammonium cation lithium phthalocyanine anion complex, wherein the solid-state electrolyte is positioned between the lithium-based anode and the cathode.

2. The lithium ion battery cell of claim 1, wherein the alkylammonium cation of the cathode is selected from the group consisting of tetrabutylammonium, tridodecylbutylammonium, and 1,3-bis(1-adamantyl)imidazolium.

3. The lithium ion battery cell of claim 1, wherein the cathode further comprises a lithium salt.

4. The lithium ion battery cell of claim 3, wherein the lithium salt is selected from the group consisting of lithium bis(trifluoromethanesulfonyl)imide, lithium tetrafluoroborate, lithium iodide, lithium chloride, and lithium bromide.

5. The lithium ion battery cell of claim 3, wherein the cathode further comprises a binder and an electronically-conductive additive.

6. The lithium ion battery cell of claim 1, wherein the alkoxyalkylammonium cation of the solid-state electrolyte is selected from the group consisting of 2-(2-methoxyethyoxy)-N,N-bis[2-(2-methoxyethyoxy)ethyl]-N-methylethanaminium and N,N- dibutyl-N-(2- ethyoxyehtyl)-1-butanaminium.

7. The lithium ion battery cell of claim 1, wherein the solid-state electrolyte further comprises a lithium salt.

8. The lithium ion battery cell of claim 7, wherein the lithium salt is selected from the group consisting of lithium bis(trifluoromethanesulfonyl)imide, lithium tetrafluoroborate, lithium iodide, lithium bromide, and lithium chloride.

9. The lithium ion battery cell of claim 1, wherein the solid-state electrolyte further comprises dilithium phthalocyanine.

10. The lithium ion battery cell of claim 1, further comprising:
a first current terminal adjacent a side of the cathode that opposes the solid-state electrolyte; and
a second current terminal adjacent a side of the anode that opposes the solid-state electrolyte.

11. The lithium ion battery cell of claim 1, wherein the anode is lithium metal or a lithium composite anode further comprising dilithium phthalocyanine with lithium metal.

12. A lithium ion battery comprising:
a plurality of lithium ion battery cells of claim 1 arranged in a series such that the anode of one lithium ion battery cell of the plurality is adjacent to the cathode of another lithium ion battery cell of the plurality;
a negative terminal adjacent to the anode of the outer most one lithium ion battery cell of the plurality; and
a positive terminal adjacent to the cathode of the outer most one lithium ion battery cell of the plurality.

13. The lithium ion battery cell of claim 1, wherein the solid-state electrolyte further comprises a binder.

* * * * *